United States Patent [19]

Reedy

[11] 4,426,850

[45] Jan. 24, 1984

[54] HEAT PUMP CONTROL HAVING AN ELECTRONIC CONTROL MODULE WITH A BYPASS SYSTEM

[75] Inventor: Wayne R. Reedy, Cazenovia, N.Y.

[73] Assignee: Carrier Corporation, Syracuse, N.Y.

[21] Appl. No.: 362,779

[22] Filed: Mar. 29, 1982

[51] Int. Cl.³ .................. F25B 49/00; F25D 29/00
[52] U.S. Cl. ................................ 62/125; 62/161; 62/298; 364/187
[58] Field of Search ............... 62/125, 126, 127, 298, 62/161, 163; 364/180, 181, 184, 187; 307/19, 85, 86; 339/18 R

[56] References Cited

U.S. PATENT DOCUMENTS

| 3,736,765 | 6/1973 | O'Dell ................................. 62/125 |
| 4,157,785 | 6/1979 | Freliech ............................ 236/1 G |
| 4,307,775 | 12/1981 | Saunders et al. .................... 62/127 |

FOREIGN PATENT DOCUMENTS 996217 8/1976 Canada ............................... 364/187

Primary Examiner—Edward G. Favors
Assistant Examiner—Harry Tanner
Attorney, Agent, or Firm—David L. Adour

[57] ABSTRACT

An electrical control system for environmental conditioning equipment such as a heat pump is disclosed. An electronic control module in the control system has input and output plugs which may be disconnected from the module and connected to each other so that the module is bypassed while maintaining basic operation of the equipment. This allows the electronic control module to be serviced, tested, and/or repaired while maintaining basic operation of the equipment.

4 Claims, 4 Drawing Figures

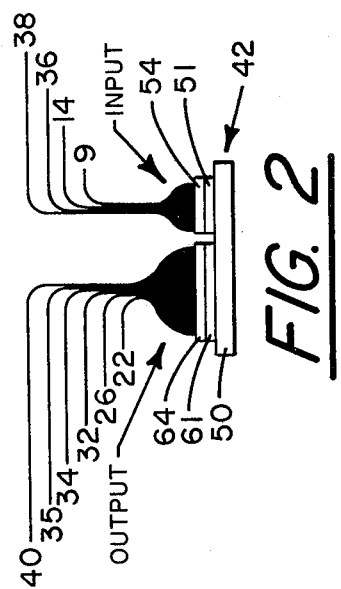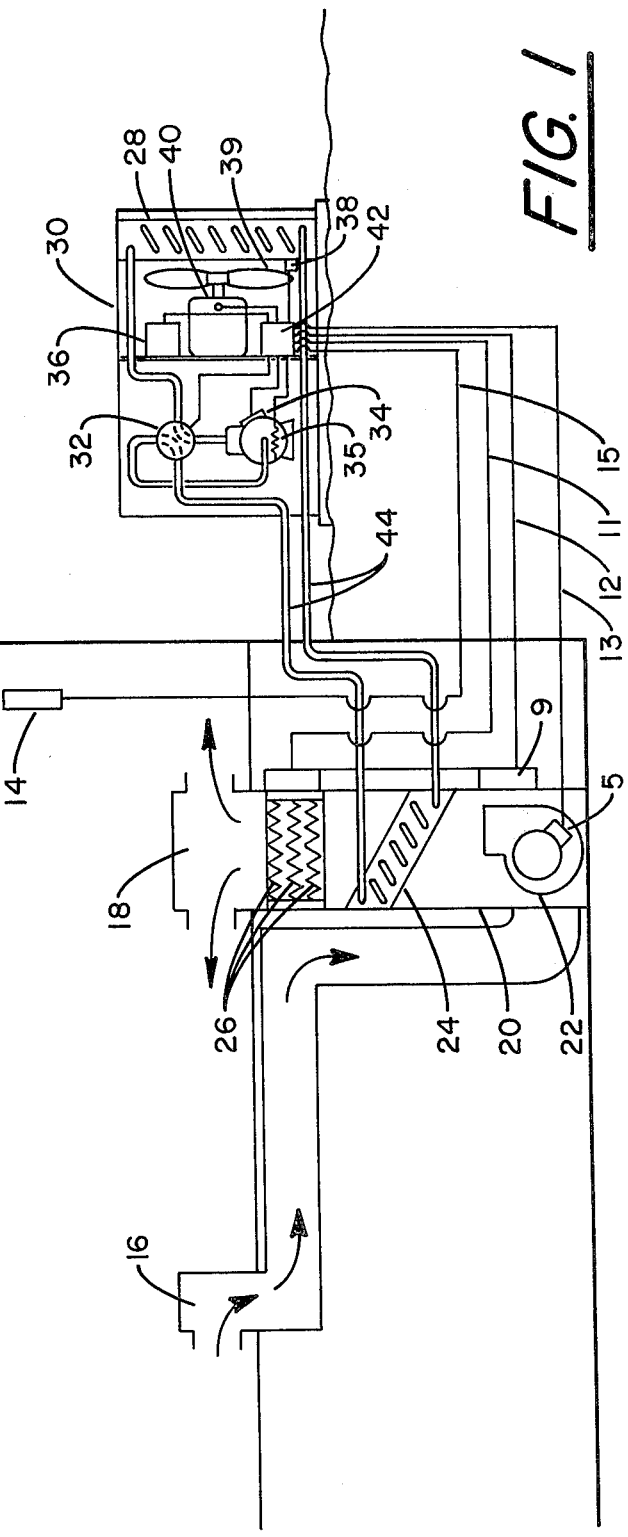

HEAT PUMP CONTROL HAVING AN ELECTRONIC CONTROL MODULE WITH A BYPASS SYSTEM

BACKGROUND OF THE INVENTION

The present invention relates to electrical control systems for environmental conditioning equipment such as heat pumps.

Typically, environmental conditioning equipment, such as a heat pump, includes an electrical control system for monitoring selected variable conditions of the conditioned environment and of the conditioning equipment and for controlling various selected functions of the equipment in response to the monitored variables. Conventionally, the electrical control system comprises a thermostat connected by electrical wiring and temperature sensors, switches, and electrical relays. The relays control operation of selected components of the equipment. Electrical power is supplied directly to the thermostat which routes power to particular relays depending on the setting of the thermostat.

In modern equipment, the electrical control system may include an electronic control module including a microcomputer or other such device for receiving a plurality of electrical input signals, corresponding to various monitored variables, and for generating electrical outut signals, in response to the input signals, for controlling various functions of the environmental conditioning equipment according to preprogrammed procedures. The electrical input signals to the microcomputer may represent variables such as air temperature of the conditioned environment, temperatures at selected locations in the conditioning equipment, and positions of various switches. Through activation of appropriate electrical relays the microcomputer controls functions of the conditioning equipment by actuating valves and operating fans and motors. Efficiency is improved and operating capabilities of the equipment are increased by using such an electronic control module as part of the electrical control system for the equipment.

Normally, if an electronic control module fails then the electrical control system is disabled and it is not possible to operate the environmental conditioning equipment. Also, it is not possible to remove the control module for servicing and/or testing without shutting down the equipment. However, it is desirable to operate such equipment during time periods when the control module is being serviced, repaired, or tested.

SUMMARY OF THE INVENTION

Therefore, it is an object of the present invention to provide environmental conditioning equipment with an electrical control system having an electronic control module which may be removed from the equipment for service or repair while maintaining basic operating functions of the equipment.

It is another object of the present invention to provide environmental conditioning equipment with an electrical control system having an electronic control module which may be electrically isolated from the control system for testing while maintaining basic operating functions of the equipment.

These and other objects of the present invention are attained by an electrical control system for environmental conditioning equipment comprising a thermostat, electrical relays, an electronic control module with an input electrical coupler and an output electrical coupler, a first electrical connector for connecting the thermostat to the input coupler of the electronic control module, and a second electrical connector for connecting the output coupler of the electronic control module to the relays. The first and second electrical connectors may be disconnected from the electronic control module and connected to each other to bypass the module while maintaining basic operation of the equipment. The electrical connectors each have a plurality of conducting pins which are compatible with the conducting pins of the other connector and which are prearranged so that, by properly connecting the connectors, appropriate electrical input and output leads from the connectors may be interconnected to place the equipment under direct control of the thermostat. When bypassed in this mnner the electronic control module may be serviced and/or repaired while the environmental conditioning equipment is operating.

BRIEF DESCRIPTION OF THE DRAWINGS

Other objects and advantages of the present invention will be apparent from the following detailed description in conjunction with the accompanying drawings, wherein like reference numerals identify like elements, and in which:

FIG. 1 schematically illustrates a heat pump having an electrical control system with an electronic control module.

FIG. 2 is a detailed view of the electronic control module depicted in FIG. 1.

DESCRIPTION OF THE PREFERRED EMBODIMENT

Figure 3:
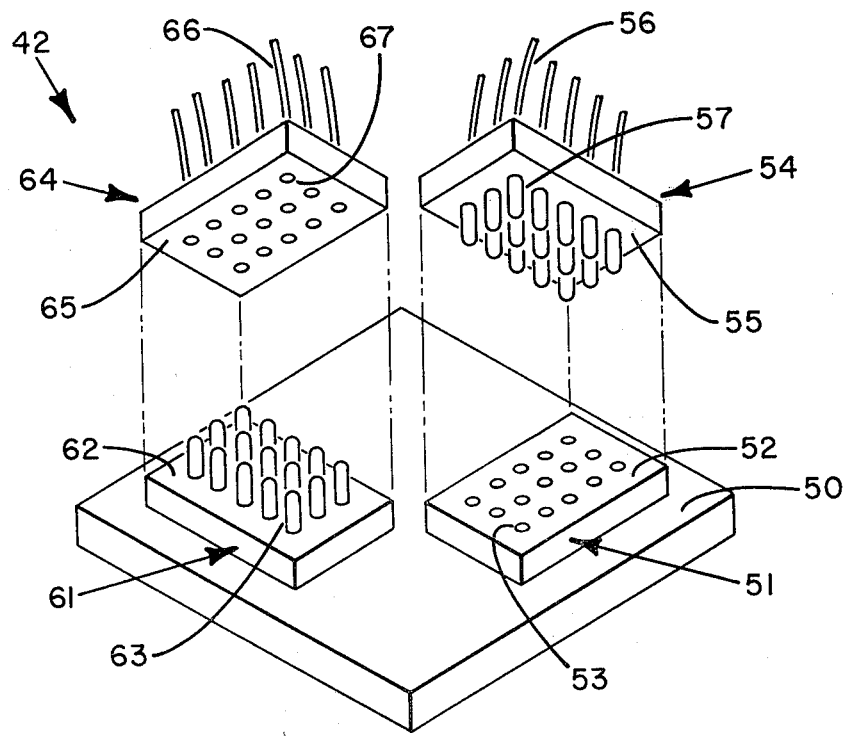
FIG. 3 shows details of a bypass system, according to the present invention, for the electronic control module depicted in FIGS. 1 and 2.

FIG. 1 is a schematic illustration of a heat pump having an electrical control system with an electronic control module 42. FIG. 2 is a detailed view of the electronic control module 42 depicted in FIG. 1.

As illustrated in FIG. 1, a house or other similar enclosure 10 has a fan coil unit 20 located therein for circulating conditioned air within the enclosure 10. A supply air duct 16 is shown for directing air from the enclosure 10 to the fan coil unit 20. A return air duct 18 is shown for directing air from the fan coil unit 20 back to the enclosure 10. In the fan coil unit 20 are an indoor fan 22, an indoor heat exchanger 24 and strip heaters 26. Indoor fan 22 circulates air from the supply duct 16 through the indoor heat exchanger 24 and strip heaters 26 and then through the return air duct 18 back to the enclosure 10. Indoor heat exchanger 24 is part of a refrigeration circuit which operates either to discharge heat energy to the air passing through the heat exchanger 24 or to absorb heat energy from this air. Strip heaters 26 are located downstream from indoor heat exchanger 24 and may be selectively energized to supply heat energy to the air flowing through the fan coil unit 20.

As shown in FIG. 1, outdoor unit 30 is located outside of the enclosure 10 on a pad adjacent to the enclosure 10. Within outdoor unit 30 are an outdoor coil 28 of the refrigeration circuit, a compressor 34, and a reversing valve 32. An outdoor fan 39 is connected to an outdoor fan motor 40 for circulating ambient air over the outdoor coil 28. Also, outdoor temperature sensor 36, outdoor coil temperature sensor 38, crankcase heater 35, and electronic control module 42 are within the outdoor unit 30.

The heat pump refrigeration circuit is made up of indoor coil 24, outdoor coil 28, compressor 34, reversing valve 32 and interconnecting piping 44. Expansion devices for providing pressure drops in fluid refrigerant flowing between different parts of the refrigeration circuit are not shown.

In the heating mode of heat pump operation heat energy is absorbed by the outdoor coil 28, which is acting as an evaporator, and heat energy is discharged to indoor air by indoor heat exchanger 24 which is operating as a condenser. In the cooling mode of heat pump operation, the reversing valve 32 is switched so that hot gaseous refrigerant from the compressor 34 is directed first to the outdoor coil 28, which is now serving as a condenser, and then to the indoor coil 24, which is now serving as an evaporator for absorbing heat energy from the indoor air.

Additionally, FIG. 1 illustrates a thermostatic control means for thermostat 14, a power supply or transformer 9 with electrical cable 12 to the control module 42, electrical cable 11 to the strip heaters 26, and an electrical relay means 5 associated with indoor fan 22 for controlling operation of the fan 22. A cable 13 electrically connects the relay means 5 for the indoor fan 22 to the electronic control module 42. Electrical power for the electrical control system is directed first to control module 42 via cable 12 then to thermostat 14 via electrical cable 15 and finally back to the control module 42 also via electrical cable 15. This allows power to the control system to be controlled by the thermostat 14 in the enclosure 10.

It should be noted that, although single lines are shown in FIG. 1 for all electrical cables to the control module 42, including the cables 11, 12, 13, and 15, each cable may include a plurality of electrical leads. Alo, it should be noted that, although only the relay means 5 for the indoor fan 22 is illustrated in FIG. 1, there is at least one relay means associated wwith each component of the heat pump which is controlled by output signals from the control module 42. Thus, the strip heaters 26, the reversing valve 32, compressor 34, crankcase heater 35, and outdoor fan motor 40, each have at least one relay means (not shown) for individually controlling operation of each component in response to output signals from the control module 42.

Referring to FIG. 3, details are shown of a bypass system, according to the present invention, for the electronic control module 42 illustrated in FIG. 1. As shown in FIG. 3, the control module 42 comprises a circuit board 50 with an input electrical coupler 51 and an output electrical coupler 61 which are connectable to a first electrical connector or input plug 54 and to a second electrical connector or output plug 64, respectively. The input plug 54 has a plurality of input electrical leads, such as lead 56, which are attached through an input plug body 55 to solid conducting pins, such as pin 57, which extend from the input plug body 55. Each input electrical lead is attached to a single individual conducting pin. The input electrical coupler 51 has an input coupler body 52 with hollow conducting pins, such as pin 53, arranged to mate with the solid conducting pins of the input plug 54.

The output plug 64 also has a plurality of output electrical leads, such as lead 66, each attached to a single, individual hollow conducting pin, such as pin 67, through an output plug body 65. The output electrical coupler 61 has an output coupler body 62 with solid conducting pins, such as pin 63, extending from the body 62 and arranged for mating with the hollow conducting pins of the output plug 64 in a manner similar to the mating arrangement of the input plug 54 and input electrical coupler 51. Although fifteen pin couplers 51 and 61 and fifteen pin plugs 54 and 64, are shown in FIG. 3, each corresponding coupler and plug may have any number pins as long as the input and output electrical leads are interconnected in the desired manner when each plug is connected to its corresponding coupler.

In operation, the circuit board 50 of the electronic control module 42 receives input electrical signals via the input electrical leads of the input plug 54 and processes these signals according to preprogrammed procedures. Then, the circuit board 50 generates output electrical signals in response to the processed input signals and supplies these output signals to the output electrical leads of the output plug 64. The output electrical leads are connected to the relay means, such as the relay means 5 associated with indoor fan 22, and the output signals from the module 42 operate the relays to control operation of the associated heat pump components by activating motors and valves of the heat pump components. The circuit board 50 may include any of a variety of electrical devices capable of processing the received input electrical signals and generating desired output signals in response thereto. For example, the circuit board 50 may include a microcomputer, such as a model 3870 microcomputer, manufactured by Mostek Corporation of Carrollton, Texas, and associated electrical devices.

As shown by FIGS. 1, 2, and 3, the input electrical leads of the input plug 54, such as lead 56, provide electrical connections to the thermostat 14, outdoor temperature sensor 36, outdoor coil temperature sensor 38, and power supply 9. The number of leads and kinds of inputs may vary depending on the capabilities of the electronic control module 42 and the particular variables of the heat pump system or other environmental conditioning equipment which it is desired to monitor and/or control. It should be noted that several leads may run to individual components of the heat pump system. For example, several of the input electrical leads may run to the thermostat 14 via the cable 15 so that the thermostat 14 may supply predetermined patterns of input control signals, corresponds to selectable settings of the thermostat 14, to the circuit board 50 via the input plug 54 and electrical input coupler 51. Two of the input electrical leads may run to each sensor, such as to the outdoor temperature sensor 36. Similarly, different numbers of input electrical leads may run to other components of the heat pump system. In addition, some of the input electrical leads may not be connected to any component or may be connected to components which are not part of the heat pump system. The number and kind of electrical signals supplied by the input electrical leads to the circuit board 50 is largely a matter of design choice.

Also, as shown by FIGS. 1, 2, and 3, the output electrical leads of the output plug 64, such as lead 66, provide electrical connections to the relay means 5 associated with indoor fan 22, and to the relays associated with the strip heaters 26, the reversing valve 32, the compressor 34, the crankcase heater 35, and the outdoor fan motor 40. These output electrical leads have the same general features as the input electrical leads of the input plug 54. For example, several output electrical leads may correspond to several relays associated with a single component of the heat pump system. Also, the number of output electrical leads may vary depending on the capabilities of the electronic control module 42 and the particular functions of the heat pump system which it is desired to control.

Figure 4:
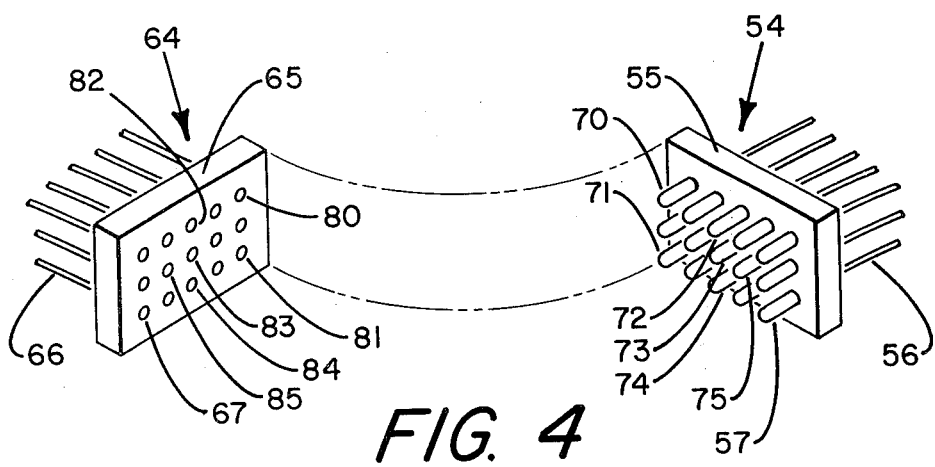
FIG. 4 illustrates the plug connections for bypassing the electronic control module shown in FIGS. 1, 2 and 3.

As shown in FIG. 4, the input plug 54 and output plug 64 are connectable to each other to bypass the electronic control module 42 so that the module 42 may be removed for testing, service, and/or repair. The conducting pins on each plug are arranged so that the heat pump is operational when the plugs 54 and 64 are connected to bypass the module 42. Basic operating functions of the heat pump are maintained, through connection of the plugs 54 and 64, by routing power from the transformer 9 directly to the thermostat 14 and by providing direct thermostat control of heat pump components such as the reversing valve 32, strip heaters 26, indoor fan 22, and compressor 34. The control signals from the thermostat 14 are used to directly control some or all of the relays, such as the relay means 5, to maintain the basic operation of the heat pump. The particular heat pump functions which are controlled directly by the thermostat 14 are largely a matter of design choice as long as the basic operating functions of the heat pump are maintained. Also, it should be noted that all the conducting pins of the input plug 54 may not be connected to relays and that pins corresponding to inputs other than thermostat inputs may be connected to the relays. Further, it should be noted that the pins on each plug 54 and 64 may be sized or arranged in a pattern so that the plugs 54 and 64 are connectable only in the desired orientation to obtain proper interconnection of control signals from the thermostat 14 or other input signals, and appropriate relays.

Also, FIG. 4 shows a particular conducting pin connection scheme which may be used to maintain basic operating functions of the heat pump shown in FIG. 1, when the input plug 54 and output plug 64 are connected to bypass the control module 42. Input plug pins 70 and 71 are connected to output plug pins 80 and 81 to provide power from the transformer 9 directly to thermostat 14 via the cable 15. Then, depending on the selected setting of the thermostat 14, power is supplied from the thermostat 14, back through the cable 15, to particular pins of input plug 54 such as pins 72–75. Pins 82–85 of output plug 64 correspond to the pins 72–75 of input plug 54. The pins 82, 83, and 84 provide connections to control relays for the reversing valve 32, compressor 34, and to relay means 5 for the indoor fan 22. Pin 85 provides connection to a control relay for one of the strip heaters 26. Depending on the setting of thermostat 14, the relays are activated to supply power to either the cooling or heating components of the heat pump via input plug pins 72–75 and corresponding output plug pins 82–85. Either cooling or heating is provided for the enclosure 10 depending on the position of the reversing valve 32 as controlled by the pattern of electrical control signals at the pins 72–75 from the thermostat 14. In the heating mode of operation strip heater operation may also be available. According to this particular pin connection scheme, the other conducting pins on the plugs 54 and 64 are neutral connections not affecting operation of the heat pump. Thus, this particular connection scheme provides basic heating or cooling operation of the heat pump but does not provide any other heat pump control functions. However, other connection schemes for maintaining other specific heat pump functions will be obvious to one of ordinary skill in the art.

Finally, it should be noted that as shown in FIGS. 3 and 4, the input plug 54 has solid conducting pins for mating with the hollow conducting pins of the input coupler 51 and the output plug 64 has hollow conducting pins for mating with the solid conducting pins of the output electrical coupler 61. However, the particular construction of the conducting pins is not critical as long as the plugs 54 and 64 are compatable with each other and with the appropriate electrical coupler 51 or 61. Also, while the present invention has been described relative to an electronic control for a heat pump system, the present invention is useful with many other kinds of heating and cooling equipment. Therefore, while the present invention has been described in conjunction with a particular embodiment it is to be understood that various modifications and other embodiments of the present invention may be made without departing from the scope of the invention as described herein and as claimed in the appended claims.

What is claimed is:

1. An electrical control system for environmental conditioning equipment comprising:
   a thermostatic control means for generating predetermined patterns of electrical control signals with each control signal pattern corresponding to a selectable setting of said thermostatic control means;
   relay means for receiving electrical signals and for controlling selected functions of the conditioning equipment in response to the received electrical signals;
   an electronic control module for receiving a plurality of electrical input signals, for processing the input signals according to preprogrammed procedures, and for generating a plurality of electrical output signals in response to the processed input signals;
   a first electrical connector means with a plurality of electrical input leads arranged in a preselected pattern, for connecting at least the thermostatic control means to the electronic control module, to input the electrical control signals generated by the thermostatic control means to the electronic control module; and
   a second electrical connector means with a plurality of electrical output leads arranged in another preselected pattern which is compatible with the preselected pattern of electrical input leads of the first electrical connector means, for connecting the electronic control module to the relay means to supply the electrical output signals from the electronic control module to the relay means, said first and second electrical connector means disconnectable from the electronic control module and connectable to each other to bypass the electronic control module and to supply at least the control signals from the thermostatic control means directly via the electrical input and the electrical output leads to the relay means to operate the environmental conditioning equipment directly under control of the thermostatic control means when the first and second electrical connector means are connected to each other.

2. An electrical control system for environmental conditioning equipment as recited in claim 1 wherein the electronic control module comrises:

a microcomputer system having a first electrical coupling means for connection to the first electrical connector means to receive input signals from at least the thermostatic control means, and having a second electrical coupling means for connection to the second electrical connector means to supply electrical output signals to the relay means.

3. An electrical control system for environmental conditioning equipment as recited in claim 2 wherein the first and second electrical connector means comprise:

first and second electrical plugs with one plug having a plurality of solid conducting pins extending therefrom for connecting the plug to one coupling means of the microcomputer and with the other plug having a plurality of hollow conducting pins embedded therein for connecting the plug to the other coupling means of the microcomputer, said conducting pins of each plug arranged in a mutually compatible pattern so that the plugs may be connected to each other to supply control signals from the thermostatic control means directly to the relay means to operate the environmental conditioning equipment directly under control of the thermostatic control means thereby bypassing the electronic control module.

4. An electrical control system for a heat pump including a compressor, a reversing valve, an indoor fan, and at least one strip heater, said control system comprising:

a thermostat means for generating predetermined patterns of electrical control signals, with each electrical control signal pattern corresponding to a selectable setting of said thermostat means, including a first pattern calling for cooling, a second pattern calling for heating, and a third pattern calling for heating with operation of the strip heater;

relay means for receiving electrical signals, and for controlling selected components of the heat pump in response to the received electrical signals, including at least the heat pump reversing valve, the heat pump indoor fan, the heat pump compressor, and the strip heater;

an electronic control module for receiving a plurality of electrical input signals, for processing the input signals according to preprogrammed procedures, and for generating a plurality of electrical output signals in response to the processed input signals;

a power supply for supplying power to the electrical control system;

a first electrical connector means with a plurality of electrical input leads arranged in a preselected pattern, for connecting the thermostat means to the electronic control module to input the electrical control signals generated by the thermostat means to the electronic control module, and for connecting the power supply to the electronic control module; and a second electrical connector means with a plurality of electrical output leads arranged in a preselected pattern compatible with the preselected pattern of electrical input leads of the first electrical connector means, for connecting the electronic control module to the relay means to supply the electrical output signals from the electronic control module to the relay means, said first and second electrical connector means disconnectable from the electronic control module and connectable to each other to bypass the electronic control module and to at least supply power from the power supply directly to the thermostat means and to supply either the first, second, or third control signal pattern from the thermostat means directly via the electrical input and the electrical output leads to the relays for the reversing valve, indoor fan, compressor, and strip heater to operate the heat pump directly under control of the thermostat means in response to the selected setting of the thermostat when the first and second electrical connector means are connected to each other.

* * * * *